United States Patent
Yoshida et al.

(10) Patent No.: US 6,891,542 B2
(45) Date of Patent: May 10, 2005

(54) IMAGE PROCESSING INTEGRATED CIRCUIT, IMAGE PROCESSING SYSTEM AND METHOD FOR IMAGE PROCESSING

(75) Inventors: Shigeki Yoshida, Chiba-ken (JP); Yoshio Kaneko, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 160 days.

(21) Appl. No.: 10/292,508

(22) Filed: Nov. 13, 2002

(65) Prior Publication Data

US 2003/0090492 A1 May 15, 2003

(30) Foreign Application Priority Data

Nov. 13, 2001 (JP) ...................................... 2001-347218

(51) Int. Cl.$^7$ ............................................... G06T 1/60
(52) U.S. Cl. ........................ 345/530; 345/519; 382/276
(58) Field of Search ................................ 345/530, 519; 382/276

(56) References Cited

U.S. PATENT DOCUMENTS 5,528,361 A * 6/1996 Sakata ........................ 358/296
6,172,918 B1 * 1/2001 Hidaka ................... 365/189.11
6,282,310 B1 * 8/2001 Kadowaki .................... 382/162

FOREIGN PATENT DOCUMENTS

JP 11-15962 1/1999

* cited by examiner

Primary Examiner—Matthew C. Bella
Assistant Examiner—Mackly Monestime
(74) Attorney, Agent, or Firm—Oblon, Spivak, McClelland, Maier & Neustadt, P.C.

(57) ABSTRACT

An image processing integrated circuit including a CPU configured to supply an image data, frame information of the image data and a first write destination address indicating an address to which the image data is written; a latch circuit configured to receive the frame information from the CPU; an address scrambler configured to allocate second write destination addresses based on the first write destination address supplied from the CPU and the frame information supplied from the latch circuit; a RAM configured to store the image data supplied from the CPU according to the second write destination address supplied from the address scrambler; and a DA converter configured to perform the digital-analog conversion for the image data supplied from the RAM and for supplying a first read destination address corresponding to the first write destination address one to one, to the address scrambler after the conversion.

6 Claims, 5 Drawing Sheets

IMAGE PROCESSING INTEGRATED CIRCUIT, IMAGE PROCESSING SYSTEM AND METHOD FOR IMAGE PROCESSING

CROSS REFERENCE TO RELATED APPLICATIONS

This application is based upon and claims the benefit of priority from prior Japanese Patent Application P2001-347218 filed on Nov. 13, 2001; the entire contents of which are incorporated by reference herein.

BACKGROUND OF THE INVENTION

1. Field of the Invention

The present invention relates to an image processing integrated circuit (large-scale semiconductor integrated circuit) used in a personal computer and the like and to an image processing method.

2. Description of the Related Art

Figure 1:
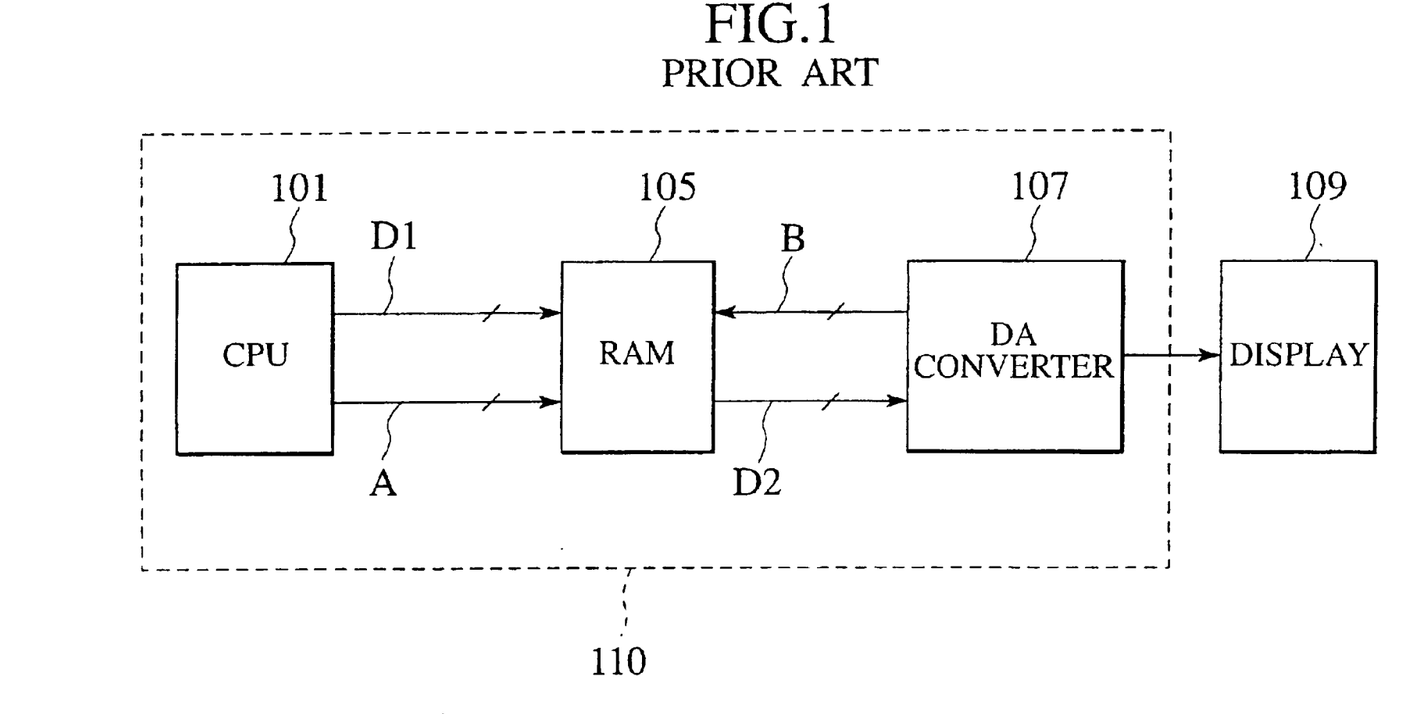
FIG. 1 is a block diagram showing a system configuration of a conventional image processing integrated circuit.

As shown in FIG. 1, a conventional image processing integrated circuit 110 mainly includes a central processing unit (CPU) 101, a random access memory (RAM) 105 and a digital-analog (DA) converter 107.

The CPU 101 supplies a digital image data (D1) of one frame to the RAM 105. The term "one frame" means one screen displayed in a display 109. The RAM 105 stores the image data (D1) of one frame therein in accordance with a write destination address (A) supplied from the CPU 101.

The RAM 105 has a plurality of memory cells, each of which is constituted by addresses and bits. The addresses and bits of the memory cell correspond to display positions and display states of the display 109, one to one.

The DA converter 107 supplies a read destination address (B) to the RAM 105, receives a digital image data (D2) corresponding to the read destination address (B) from the RAM 105 and then converts the digital image data into analog image data. Moreover, each time a digital-analog conversion of the image data is completed, the DA converter 107 supplies a read destination address (B) of a next memory cell to the RAM 105. Here, the write destination address (A) and the read destination address (B) correspond one to one. The display 109 displays the analog image data supplied from the DA converter 107 at each specified pixel position.

As described above, when the digital-analog conversion of the image data for one frame is finished, the CPU 101 supplies a digital image data (D1) for the next frame to the RAM 105. Image processing is performed by repeating the above operation.

Next, description will be made of a defect position in the display 109 when there is a defect in the RAM 105, using FIG. 2. To simplify the description, herein, an image data composed of 8 bits (bits of 0 to 7) corresponds to each address of the RAM 105, and the image data shows brightness for one pixel of the display 109. Moreover, it is assumed that a write destination address 1 corresponds to a pixel at an upper left corner of the display 109 and a write destination address 2 corresponds to a pixel next to the foregoing pixel on its right. Herein, the next write destination address of a rightmost pixel of the display 109 moves to a leftmost pixel in the following line, and write destination address 99999 represents a pixel at the lower right corner of the display 109.

Figure 2A:
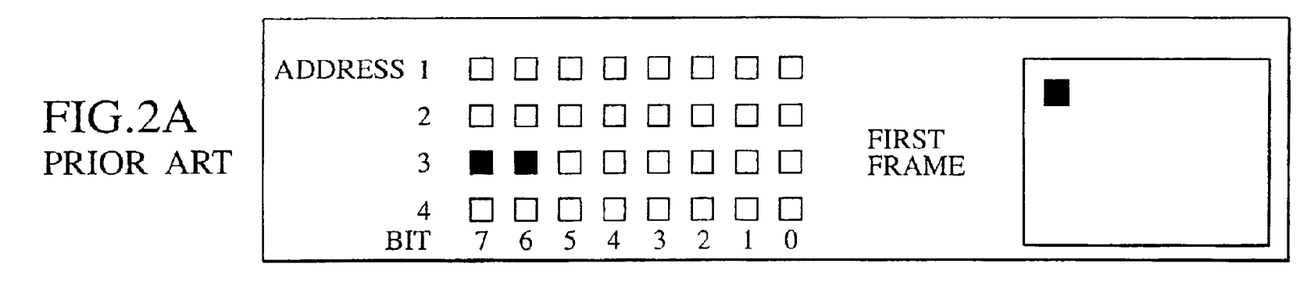
FIGS. 2A to 2C are views showing a relationship between a RAM defect and a defective spot in a display in a conventional case.
Figure 2B:
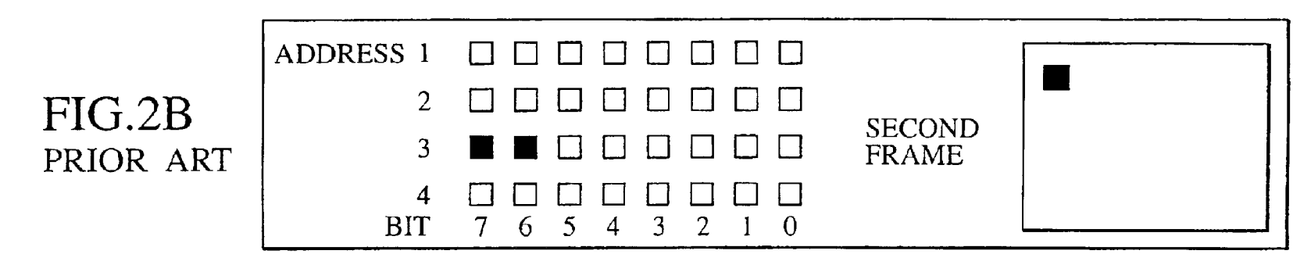
Figure 2C:
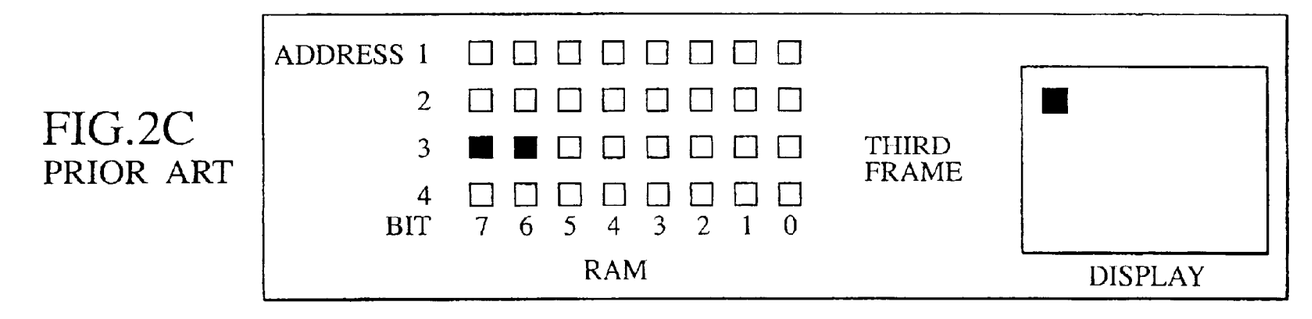

As shown in FIGS. 2A to 2C, it is assumed that a defect occurs, in which bits 6 and 7 of the address (write destination address; read destination address) 3 of the RAM 105 are fixed to 0. When the bit 7 is the most significant bit upon the digital-analog conversion, the brightness of these high two bits is altered remarkably. In other words, when the both bits become 0, a pixel is displayed in a near-black color at a display position of the display 109, the display position corresponding to the address (write destination address; read destination address) 3. Since the addresses of the RAM 105 and the display positions of the display 109 correspond one to one, as shown in FIGS. 2A to 2C, the display position of the display 109, which corresponds to the address 3, is displayed in a near-black color throughout a first frame, a second frame and a third frame.

For example, in the case where image data for 100 frames is stored/read to the RAM 105 per second, since the write destination addresses (read destination addresses) of the RAM 105 and the display positions of the display 109 remain unchanged during the 100 frames, the near-black color is displayed at the same display position. Consequently, a person's eyes looking at the display 109 perceive black dots, and thus the person is disturbed by the defects.

Note that, when a defect occurs, in which the bits 6 and 7 of the address (write destination address; read destination address) 3 of the RAM 105 are fixed to 1, the display 109 displays a near-white color. Similarly, a person's eyes looking at the display 109 perceive white dots, and thus the person is disturbed by the defects.

SUMMARY OF THE INVENTION

A first aspect of the present invention is to provide an image processing integrated circuit, comprising: a) a CPU configured to supply an image data, frame information of the image data and a first write destination address indicating an address to which the image data is written; b) a latch circuit configured to receive the frame information from the CPU; c) an address scrambler configured to allocate second write destination addresses based on the first write destination address supplied from the CPU and the frame information supplied from the latch circuit; d) a RAM configured to store the image data supplied from the CPU according to the second write destination address supplied from the address scrambler; and e) a DA converter configured to perform the digital-analog conversion for the image data supplied from the RAM and for supplying a first read destination address corresponding to the first write destination address one to one, to the address scrambler after the conversion.

A second aspect of the present invention is to provide an image processing integrated circuit, comprising: a) a CPU configured to supply an image data, frame information of the image data and a first write destination address indicating an address to which the image data is written; b) a latch circuit connected to the CPU; c) an address scrambler connected to the CPU and the latch circuit; d) a RAM connected to the CPU and address scrambler; and e) a DA converter connected to the RAM and the address scrambler.

A third aspect of the present invention is to provide An image processing system, comprising: a) an image processing integrated circuit, including a CPU configured to supply an image data, frame information of the image data and a first write destination address indicating an address to which the image data is written, a latch circuit configured to receive the frame information from the CPU, an address scrambler configured to allocate second write destination addresses based on the first write destination address supplied from the CPU and the frame information supplied from the latch circuit, a RAM configured to store the image data supplied from the CPU according to the second write destination address supplied from the address scrambler, and a DA converter configured to perform the digital-analog conversion for the image data supplied from the RAM and to supply a first read destination address corresponding to the first write destination address one to one, to the address scrambler after the conversion; and b) a display configured to output the image data supplied from the DA converter.

A forth aspect of the present invention is to provide a method for image processing, comprising: a) supplying frame information of an image data to a latch circuit and supplying a first write destination address indicating an address to which the image data is written, to an address scrambler, which are performed by a CPU; b) supplying the frame information to the address scrambler using the latch circuit; c) allocating second write destination addresses by the address scrambler, based on the frame information and the first write destination address; and d) storing the image data supplied from the CPU by a RAM in accordance with the second write destination address.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

When a light is lit in the dark, human eyes are apt to perceive that the light is emitted from the same place even though the light is weak. However, the human eyes have a characteristic that, when the light moves around rapidly without regularity, the eyes cannot perceive the light. In the case where frame feeding the display is performed by changing 100 frames per second, when the position of the light changes randomly, human eyes hardly perceive the light. On the contrary, in the case where there is a black dot in the light, when the black dot stays in the same place, the human eyes are apt to notice the black dot. However, when the black dot moves around randomly, human eyes hardly perceive the black dot.

The present invention utilizes a point that, by randomly changing the allocation of addresses of a RAM for every frame fed, even when a bit defect occurs in the RAM, the position of the defect randomly changes on the display, thus making it difficult for human eyes to perceive the defect.

Figure 3:
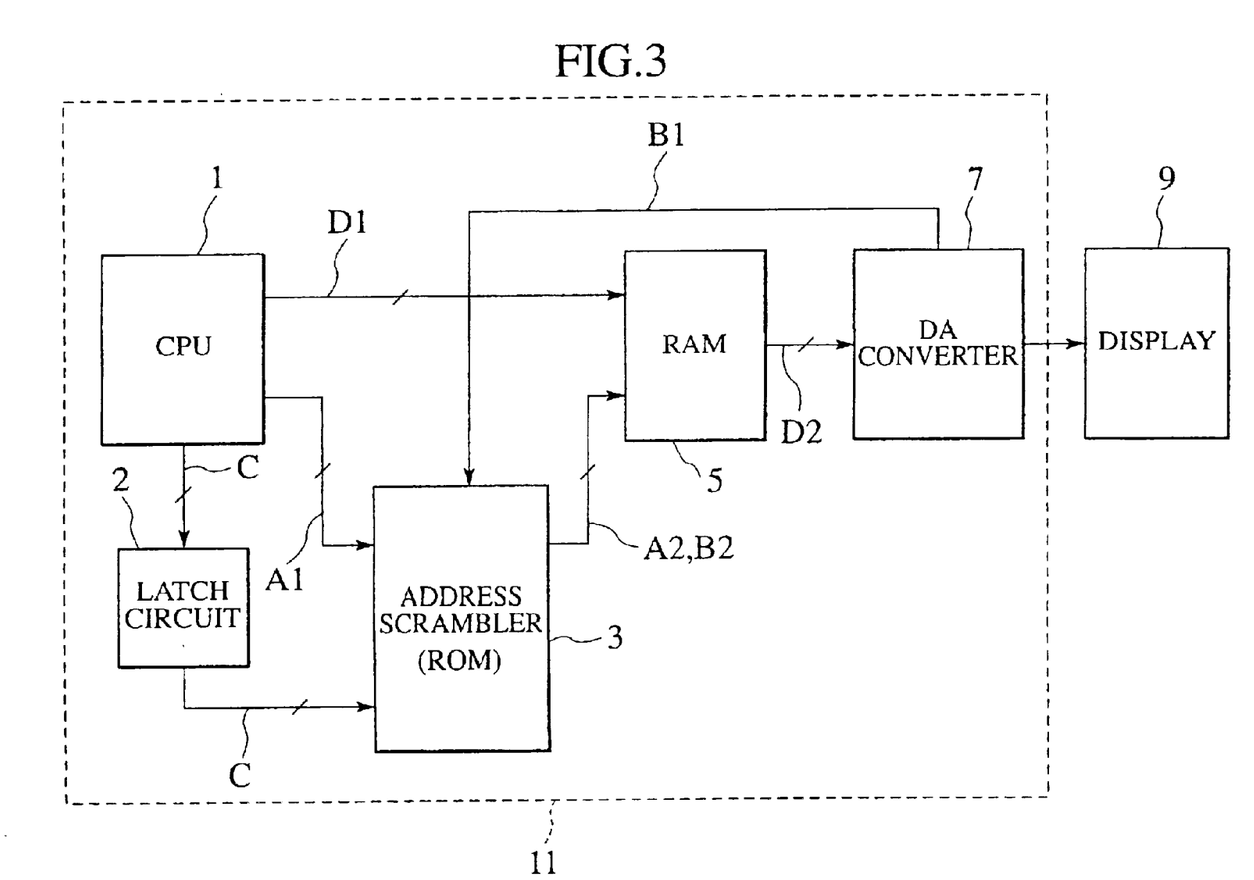
FIG. 3 is a block diagram showing a configuration of an image processing system according to an embodiment of the present invention.

As shown in FIG. 3, an image processing system according to an embodiment of the present invention includes an image processing integrated circuit 11 and a display 9. The image processing integrated circuit 11 includes: a CPU 1 for supplying an image data (D1), frame information (C) of the image data and a first write destination address (A1) indicating an address to which the image data is written; a latch circuit 2 for receiving the frame information (C) from the CPU 1; an address scrambler 3 for allocating second write destination addresses (A2) based on the first write destination address (A1) supplied from the CPU 1 and the frame information (C) supplied from the latch circuit 2; a RAM 5 for storing the image data (D1) supplied from the CPU 1 in accordance with the second write destination address (A2) supplied from the address scrambler 3; and a DA converter 7 for performing the digital-analog conversion for image data (D2) supplied from the RAM 5, and for supplying a first read destination address (B1) corresponding to the first write destination address (A1) one to one, to the address scrambler 3 after the conversion.

The CPU 1 supplies the first write destination address (A1), the frame information (C) and the image data (D1) to the address scrambler 3, the latch circuit 2 and the RAM 5, respectively. The first write destination address (A1) is an address supplied to the address scrambler 3 by the CPU 1 and is the first address 1 at the beginning. The frame information (C) is data of 6 bits for determining which frame the image data is currently being supplied.

The latch circuit 2 keeps supplying frame information (C) to the address scrambler 3 until the next frame information (C) is supplied from the CPU 1.

The address scrambler 3 supplies the second write destination address (A2) and a second read destination address (B2) to the RAM 5. The second write destination address (A2) is an address allocated based on the frame information (C) and the first write destination address (A1). The second read destination address (B2) is an address allocated based on the frame information (C) and the first read destination address (B1). The second write destination address (A2) and the second read destination address (B2) correspond one to one. The address scrambler 3 has a function of allocating addresses, and specifically, a ROM and the like may be used therefor.

The RAM 5 stores the image data (D1) for one frame supplied from the CPU 1, the image data corresponding to the frame information (C) in accordance with the second write destination address (A2) supplied from the address scrambler 3. Moreover, the RAM 5 reads the stored image data in accordance with the second read destination address (B2) supplied from the address scrambler 3.

The DA converter 7 performs the digital-analog conversion for the image data (D2) read from the RAM 5, and supplies the first read destination address (B1) to the address scrambler 3 at the time of each digital-analog conversion. The first read destination address (B1) corresponds to the first write destination address (A1), one to one.

The display 9 outputs the image data supplied from the DA converter 7. The display 9 means a output unit such as a monitor. Usable for the display are: a liquid crystal display (LCD); a light-emitting diode (LED) panel; an electroluminescence (EL) panel, and the like.

According to the image processing integrated circuit of the embodiment of the present invention, even when there is a defect in a part of the RAM, satisfactory display of the display can be achieved.

Figure 4:
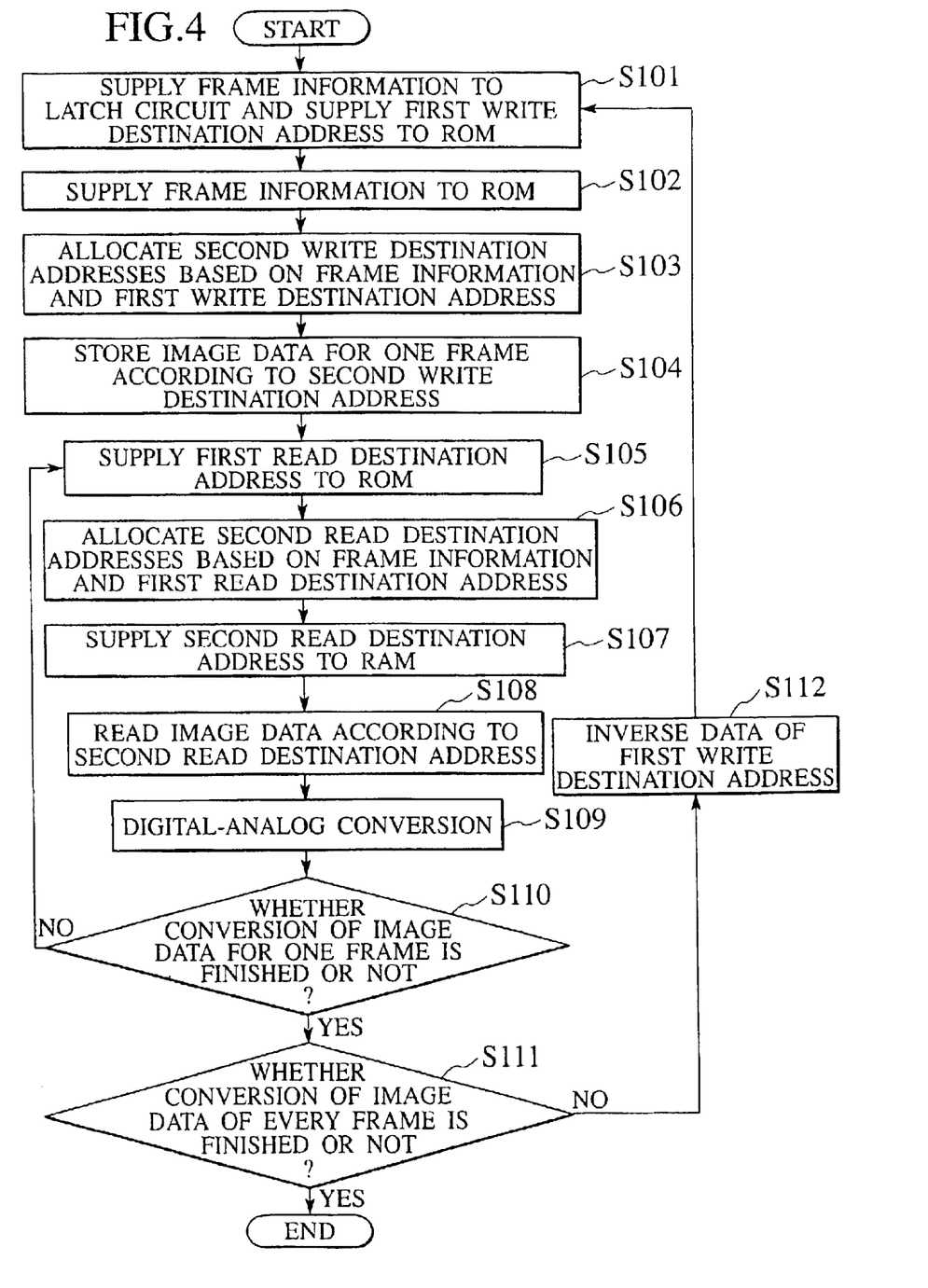
FIG. 4 is a flowchart of a method of image processing according to the embodiment of the present invention.

Next, referring to FIG. 3, description will be made of a method for image processing according to the embodiment of the present invention, using FIG. 4. In the following description, a ROM 3 will be used for the address scrambler 3. Moreover, for simplifying the description, it is assumed that an image data composed of 8 bits (bits of 0 to 7) corresponds to each address of the RAM 5 and this image data indicates brightness for one pixel of the display 9. Furthermore, it is assumed that a write destination address 1 corresponds to a pixel at an upper left corner of the display 9, and a write destination address 2 corresponds to a pixel next to the later pixel on its right. Herein, a next write destination address of a rightmost pixel of the display 9 moves to a leftmost pixel in the following line, and write destination address 99999 represents a pixel in the lower right corner of the display 9.

(a) First, in Step S101, the CPU 1 supplies frame information (C) of a first frame to the latch circuit 2, and supplies a first write destination address (A1) of a first memory cell in the first frame to the ROM 3. Next, in Step S102, the latch circuit 2 supplies the frame information (C) to the ROM 3. Then, in Step S103, the ROM 3 allocates second write destination addresses (A2) based on the frame information (C) and first write destination address (A1) of the first frame. By taking the frame information (C) and the first write destination address (A1) as an upper bit and a lower bit, respectively, the ROM 3 allocates the second write destination addresses (A2). During the supply of the frame information (C) of the first frame, the ROM 3 stores the second write destination address (A2) identical to the first write destination address (A1). Since the first write destination address (A1) starts from data meaning the address 1 of the RAM 5, the second write destination address (A2) also starts from data meaning the address 1 of the RAM 5. The ROM 3 supplies the second write destination address (A2) to the RAM 5.

Figure 5A:
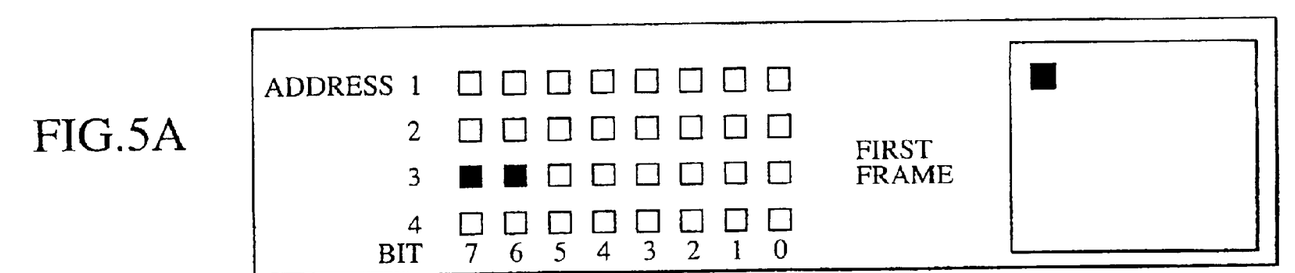
FIGS. 5A to 5C are views showing a relationship between a RAM defect and a defective spot in a display according to the embodiment of the present invention.

(b) Next, in Step S104, the RAM 5 stores an image data (D1) of the first frame supplied from the CPU 1 depending on the second write destination address (A2). In this case, as shown in FIG. 5A, it is assumed that a defect occurs, in which bits 6 and 7 of address 3 of the RAM 5 are fixed at 0.

(c) In Step S105, the DA converter 7 supplies a first read destination address (B1) of a first memory cell in the RAM 5 to the ROM 3. The first read destination address (B1) and the first write destination address (A1) correspond one to one.

(d) In Step S106, by taking the frame information (C) and the first read destination address (B1) of the first memory cell as an upper bit and a lower bit, respectively, the ROM 3 allocates second read destination addresses (B2). Then, in Step S107, the ROM 3 supplies the second read destination address (B2) of the first memory cell, which is data meaning the address 1 of the RAM 5, to the RAM 5. Thus, the RAM 5 reads an 8-bit image data (D2) stored in the address 1.

(e) In Step S108, the RAM 5 reads the image data (D2) according to the second read destination address (B2). Then, in Step S109, the DA converter 7 performs the digital-analog conversion for the image data (D2) supplied by the RAM 5.

(f) In Step S110, it is determined whether or not the conversion of the image data for one frame is complete, and if not, the procedure returns to Step S105 and the DA converter 7 supplies a first read destination address (B1) of a second memory cell to the ROM 3. Then, in Step S106, by taking the frame information (C) and the first read destination address (B1) of the second memory cell as an upper bit and a lower bit, respectively, the ROM 3 allocates second read destination addresses (B2). Subsequently, in Step S107, the ROM 3 supplies the second read destination address (B2) of the second memory cell, which is data meaning address 2 of the RAM 5, to the RAM 5. Thus, in Step S108, the RAM 5 reads an 8-bit image data stored in the address 2. Similarly, the operations of Steps S105 to S109 are repeated for all image data of the first frame. As a result, as shown in FIG. 2A, a near-black color is displayed at a display position of the display 9, which corresponds to address 3 of the RAM 5.

Figure 5B:
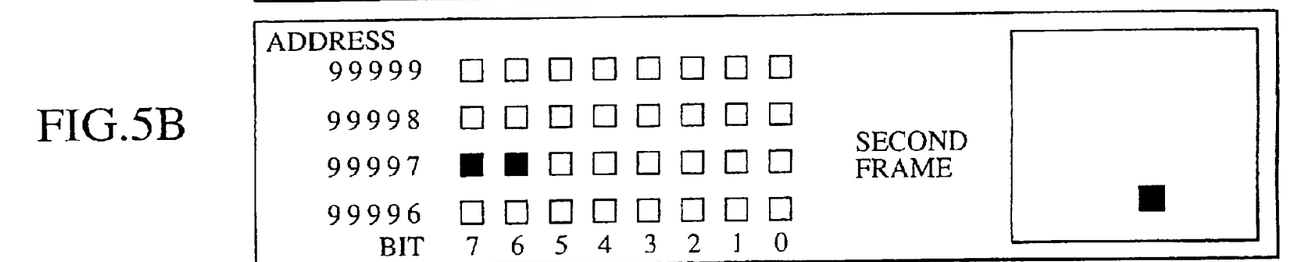

(g) Next, after the conversion of the image data of the first frame is finished in Step S110, the procedure advances to Step S111. In the case where an image data of a second frame undergoes digital-analog conversion, in Step S111, since the conversion of the image data of all frames is not complete, the procedure advances to Step S112. In Step S112, the ROM 3 inverts data of the first write destination address (A1). Regarding a method of inverting the data of the first write destination address (A1), some of the bits or all bits may be inverted. Herein, as an example, all the bits are inverted. When the image data of the second frame is subjected to the digital-analog conversion, this inverted data is continuingly retained. Then, returning to Step S101, the CPU 1 supplies frame information (C) of the second frame to the latch circuit 2 and supplies a first write destination address (A1) of a first memory cell in the second frame to the ROM 3. Next, in Step S102, the latch circuit 2 supplies the frame information (C) of the second frame to the ROM 3. Subsequently, in Step S103, by taking the frame information (C) of the second frame supplied from the latch circuit 2 and the first write destination address (A1) of the first memory cell in the second frame as an upper bit and a lower bit, respectively, the ROM 3 allocates second write destination addresses (A2). In this event, the second write destination address (A2) is the one obtained by inverting all the first write destination address (A1) of the first frame, thus resulting in 99999. The ROM 3 supplies the second write destination address (A2) of the first memory cell, which is data meaning address 99999, to the RAM 5. As a result, in Step S104, the RAM 5 stores the image data (D1) of the second frame, according to the address 99999. In accordance with the above, addresses 99998, 99997 and so on are sequentially stored after the second memory cell. In this case, as shown in FIG. 5B, a defect occurs in bits 6 and 7 of the address 99997 of the RAM 5. Next, in Step S105, the DA converter 7 supplies the first read destination address (B1) to the ROM 3. The first read destination address (B1) and the first write destination address (A1) correspond one to one. In Step S106, by taking the frame information (C) and the first read destination address (B1) of the first memory cell as an upper bit and a lower bit, respectively, the ROM 3 allocates second read destination addresses (B2). Then, in Step S107, the ROM 3 supplies the second read destination address (B2) of the first memory cell, which is data meaning the address 99999, to the RAM 5. Accordingly, in Step S108, the RAM 5 reads an 8-bit image data (D2) stored in the address 99999. Next, in Step S109, the DA converter 7 performs the digital-analog conversion for the image data (D2) supplied by the RAM 5 to the digital-analog conversion. In Step S110, when the conversion of the image data for one frame is not complete, the procedure returns to Step S105, and the DA converter 7 supplies the first read destination address (B1) of the second memory cell to the ROM 3. Then, in Step S106, by taking the frame information (C) and the first read destination address (B1) of the second memory cell as an upper bit and a lower bit, respectively, the ROM 3 allocates second read destination addresses (B2). In this event, in Step S107, the ROM 3 supplies the second read destination address (B2) of the second memory cell, which is data meaning the address 99998, to the RAM 5. Accordingly, in Step 108, the RAM 5 reads an 8-bit image data (D2) stored in the address 99998. Thereafter, the digital-analog conversion is performed in Step S109. The above operations are repeated while processing the image data of the second frame. As a result, as shown in FIG. 5B, the near-black color is displayed at a display position of the display 9, which corresponds to the address 99997 of the RAM 5.

Figure 5C:
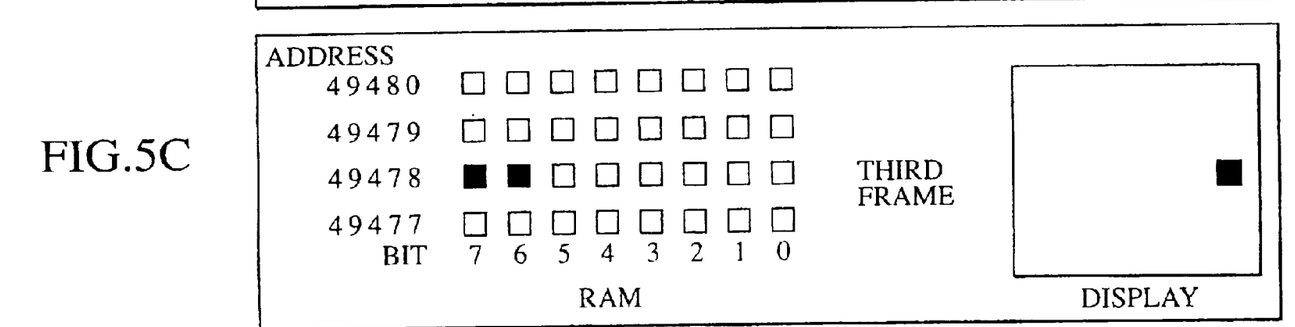

(h) Next, description will be made of the case of performing digital-analog conversion for an image data of a third frame. In Step S111, since the conversion of the image data of all frames is not complete, the procedure advances to Step S112. In Step S112, the ROM 3 inverts data of the first write destination address (A1). Regarding the method of inverting the data of the first write destination address (A1), a part of bits or all bits may be inverted. Herein, as an example, data equivalent to a top level of the first write destination address (A1) is saved as it is, and the remaining data is inverted. When the image data of the third frame is subjected to the digital-analog conversion, this inverted data is continuously retained. Then, returning to Step S101, the CPU 1 supplies frame information (C) of the third frame to the latch circuit 2 and supplies a first write destination address (A1) of a first memory cell in the third frame to the ROM 3. Next, in Step S102, the latch circuit 2 supplies the frame information (C) of the third frame to the ROM 3. Subsequently, in Step S103, by taking the frame information (C) of the third frame supplied from the latch circuit 2 and the first write destination address (A1) of the first memory cell in the third frame as an upper bit and a lower bit, respectively, the ROM 3 allocates second write destination addresses (A2). In this event, the second write destination address (A2) is the one obtained by inverting a part of the first write destination address (A1) of the first frame, thus resulting in 49480. The ROM 3 supplies the second write destination address (A2) of the first memory cell, which is data meaning address 49480, to the RAM 5. As a result, in Step S104, the RAM 5 stores the image data (D1) of the third frame, according to the address 49480. In accordance with the above, addresses 49479, 49478 and so on are sequentially stored after the second memory cell. In this case, as shown in FIG. 5C, a defect occurs in bits 6 and 7 of the address 49478 of the RAM 5. Next, in Step S105, the DA converter 7 supplies the first read destination address (B1) to the ROM 3. The first read destination address (B1) and the first write destination address (A1) correspond one to one. In Step S106, by taking the frame information (C) and the first read destination address (B1) of the first memory cell as an upper bit and a lower bit, respectively, the ROM 3 allocates second read destination addresses (B2). Then, in Step S107, the ROM 3 supplies the second read destination address (B2) of the first memory cell, which is the data meaning the address 49480, to the RAM 5. Accordingly, in Step S108, the RAM 5 reads an 8-bit image data (D2) stored in the address 49480. Next, in Step S109, the DA converter 7 performs the digital-analog conversion for the image data (D2) supplied by the RAM 5. In Step S110, when the conversion of the image data for one frame is not complete, the procedure returns to Step S105, and the DA converter 7 supplies the first read destination address (B1) of the second memory cell to the ROM 3. Then, in Step S106, by taking the frame information (C) and the first read destination address (B1) of the second memory cell as an upper bit and a lower bit, respectively, the ROM 3 allocates second read destination addresses (B2). In this event, in Step S107, the ROM 3 supplies the second read destination address (B2) of the second memory cell, which is data meaning the address 49479, to the RAM 5. Accordingly, in Step S108, the RAM 5 reads an 8-bit image data (D2) stored in the address 49479. Thereafter, the digital-analog conversion is performed in Step S109. The above operations are repeated while processing the image data of the third frame. As a result, as shown in FIG. 5C, the near-black color is displayed at a display position of the display 9, which corresponds to the address 49478 of the RAM 5.

(i) The foregoing procedure is repeated until processing image data of all frames (of a $100^{th}$ frame if the number of frames is 100). The ROM 3 randomly changes the allocation of the addresses of the RAM 5 for every frame fed. Accordingly, even when a bit defect occurs in the RAM 5, the position of the defect randomly changes on the display 9. The ROM 3 saves the second write destination address and the third read destination address therein so as to allocate different addresses to the defective spot of the RAM 5.

According to the method for image processing of the embodiment of the present invention, even when there is a defect in a part of the RAM, satisfactory display of the display can be achieved. When it is assumed that the RAM stores as well as reads image data at 100 frames per second, the position of the defect in the RAM moves irregularly in a centisecond time scale. Therefore, it becomes difficult for human eyes to perceive the defect.

The present invention is described according to the foregoing embodiment. However, one should not understand that the description and drawings constituting a part of this disclosure as limiting the invention. From this application, alternative embodiments, embodiments and operation techniques will become apparent to those skilled in the art.

For example, in the method for image processing according to the embodiment of the present invention, description for the address scrambler 3 was made using a ROM. However, there is no limitation to the address scrambler, as long as one having a function of allocating different addresses to the defective spot of the RAM 5 for each frame is used.

Moreover, description was made, in which regarding the second write destination address (A2), the frame information (C) and the first write destination address (A1) are taken as an upper bit and a lower bit, respectively. However, the first write destination address (A1) may be taken as a higher bit and the frame information (C) may be taken as a lower bit. The above point is also the same regarding the second read destination address (B2).

Moreover, in the image processing integrated circuit according to the embodiment of the present invention, description for having the CPU and the latch circuit separately was made. However, the image processing integrated circuit may have a CPU including latch function and the CPU also may work as the latch circuit.

Various modifications will become possible for those skilled in the art after receiving the teachings of the present disclosure without departing from the scope thereof.

What is claimed is:

1. An image processing integrated circuit, comprising:
   a CPU configured to supply an image data, frame information of the image data and a first write destination address indicating an address to which the image data is written;
   a latch circuit configured to receive the frame information from the CPU;
   an address scrambler configured to allocate second write destination addresses based on the first write destination address supplied from the CPU and the frame information supplied from the latch circuit;

a RAM configured to store the image data supplied from the CPU according to the second write destination address supplied from the address scrambler; and a DA converter configured to perform the digital-analog conversion for the image data supplied from the RAM and to supply a first read destination address corresponding to the first write destination address one to one, to the address scrambler after the conversion, wherein the address scrambler allocates the second write destination addresses by taking the frame information as an upper bit, and the first write destination address as a lower bit.

2. An image processing integrated circuit, comprising:

a CPU configured to supply an image data, frame information of the image data and a first write destination address indicating an address to which the image data is written;

a latch circuit configured to receive the frame information from the CPU;

an address scrambler configured to allocate second write destination addresses based on the first write destination address supplied from the CPU and the frame information supplied from the latch circuit;

a RAM configured to store the image data supplied from the CPU according to the second write destination address supplied from the address scrambler; and a DA converter configured to perform the digital-analog conversion for the image data supplied from the RAM and to supply a first read destination address corresponding to the first write destination address one to one, to the address scrambler after the conversion, wherein the address scrambler supplies a second read destination address, which corresponds to the second write destination address one to one, to the RAM, and the RAM reads the image data in accordance with the second read destination address.

3. The image processing integrated circuit of claim 2, wherein the address scrambler allocates the second read destination addresses by taking the frame information as an upper bit as well as the first read destination address as a lower bit.

4. A method for image processing, comprising:

supplying frame information of an image data to a latch circuit and supplying a first write destination address indicating an address to which the image data is written, to an address scrambler, which are performed by a CPU;

supplying the frame information to the address scrambler using the latch circuit;

allocating second write destination addresses by the address scrambler, based on the frame information and the first write destination address; and storing the image data supplied from the CPU by a RAM in accordance with the second write destination address, wherein the address scrambler allocates the second write destination addresses by taking the frame information as an upper bit as well as the first write destination address as a lower bit.

5. A method for image processing, comprising:

supplying frame information of an image data to a latch circuit and supplying a first write destination address indicating an address to which the image data is written, to an address scrambler, which are performed by a CPU;

supplying the frame information to the address scrambler using the latch circuit;

allocating second write destination addresses by the address scrambler, based on the frame information and the first write destination address;

storing the image data supplied from the CPU by a RAM in accordance with the second write destination address;

supplying a first read destination address, which corresponds to the first write destination address one to one, to the address scrambler by a DA converter;

allocating second read destination addresses by the address scrambler, based on the frame information and the first read destination address;

reading the image data by a RAM in accordance with the second read destination address; and performing a digital-analog conversion of the image data supplied from the RAM by the DA converter.

6. The method of claim 5, wherein the address scrambler allocates the second read destination addresses by taking the frame information as an upper bit and the first read destination address as a lower bit.

* * * * *